United States Patent
Mizunaga et al.

(10) Patent No.: US 7,570,715 B2
(45) Date of Patent: Aug. 4, 2009

(54) DIGITAL SIGNAL RECEIVING CIRCUIT

(75) Inventors: Sunao Mizunaga, Tokyo (JP); Tadamasa Murakami, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 617 days.

(21) Appl. No.: 11/281,465

(22) Filed: Nov. 18, 2005

(65) Prior Publication Data
US 2006/0227900 A1    Oct. 12, 2006

(30) Foreign Application Priority Data
Mar. 11, 2005    (JP)    .............................. 2005-068506

(51) Int. Cl.
*H04L 25/06* (2006.01)
(52) U.S. Cl. ....................... 375/317; 375/354; 375/340; 329/321; 329/350; 329/349; 327/58; 327/72; 327/52; 327/64; 327/60; 327/61; 327/62; 327/90
(58) Field of Classification Search ................. 375/317, 375/354, 340; 329/321, 350, 349; 327/58, 327/72, 52, 54, 60, 61, 62, 90
See application file for complete search history.

(56) References Cited
U.S. PATENT DOCUMENTS

| | | | | |
|---|---|---|---|---|
| 5,025,176 A | * | 6/1991 | Takeno | 327/58 |
| 5,412,692 A | * | 5/1995 | Uchida | 375/317 |
| 5,892,609 A | | 4/1999 | Saruwatari | |
| 6,041,084 A | * | 3/2000 | Nagaraj | 375/317 |
| 6,292,058 B1 | * | 9/2001 | Ide et al. | 330/279 |
| 2003/0198302 A1 | * | 10/2003 | Song | 375/340 |

FOREIGN PATENT DOCUMENTS

| | | |
|---|---|---|
| JP | 10-084231 | 3/1998 |
| JP | 2001-036470 | 2/2001 |

* cited by examiner

*Primary Examiner*—Chieh M Fan
*Assistant Examiner*—Siu M Lee
(74) *Attorney, Agent, or Firm*—Studebaker & Brackett PC; Donald R. Studebaker

(57) ABSTRACT

A delayed peak detector detects a peak level of an input signal IN at timing lagged behind a peak detector, and a peak difference detector detects a peak difference PLD between a delayed peak level DPL and a peak level PL. A reset portion outputs a reset signal BRS for a bottom detector when a level difference between the peak level PL and a bottom level BL exceeds a predetermined value comparable with the amplitude of the input signal IN and the peak difference PLD exceeds an allowable peak difference PLM. It is thus possible to replace the bottom level BL outputted from the bottom detector with a bottom level based on a latest input signal IN.

3 Claims, 6 Drawing Sheets

DIGITAL SIGNAL RECEIVING CIRCUIT

BACKGROUND OF THE INVENTION

1. Technical Field

The present invention relates to a digital signal receiving circuit which converts a demodulated signal to a baseband signal in a data transmission system, such as wired and wireless communications system, and more particularly, to DC-potential compensation for a demodulated signal.

2. Description of the Related Art

FIG. 2 is a view showing the configuration of a conventional digital signal receiving circuit.

The digital signal receiving circuit receives an analog signal demodulated in a demodulator circuit as an input signal IN, and regenerates an output signal OUT of the baseband by comparing the input signal IN with a reference potential REF obtained from the input signal IN.

The digital signal receiving circuit includes a peak detector 1 which detects the electric potential at the peak of the waveform of the input signal IN provided from a demodulator circuit (not shown), and a bottom detector 2 which detects the potential at the bottom of the waveform of the input signal IN. A peak level PL outputted from the peak detector 1 and a bottom level BL outputted from the bottom detector 2 are provided across a resistor 5 via buffer amplifiers 3 and 4, respectively. The reference potential REF is thus outputted from the midpoint of the resistor 5.

The reference potential REF is provided to the reference terminal of a comparator (CMP) 6, whereas the input signal IN is provided to the comparison terminal of the comparator 6, so that the output signal OUT is outputted from the output end of the comparator 6.

In the digital signal receiving circuit, the peak detector 1 is configured to maintain the peak level PL by immediately following an offset when the input signal IN rises and by following an offset with a large time constant when the signal input IN drops. The bottom detector 2 is configured contrarily to the peak detector 1 to maintain the bottom level BL by immediately following an offset when the input signal IN drops and by following an offset with a large time constant when the input signal IN rises. As a consequence, an average level of the bottom level BL and the peak level PL is outputted from the midpoint of the resistor 5 as the reference potential REF.

Further, the comparator 6 compares the input signal IN with the reference potential REF, and regenerates a binary baseband signal which indicates either "L" or "H" according to the comparison result. The baseband signal is outputted as the output signal OUT.

Examples of the related art are disclosed, for example, in Japanese Patent Applications (Kokai) No. H10-84231 and No. 2001-36470.

The digital signal receiving circuit configured as above, however, has problems as follows.

FIG. 3 is a signal waveform chart used to describe the problems with the digital signal receiving circuit of FIG. 2.

As is shown in FIG. 3, for example, when a signal with an offset which increases in DC (Direct Current) potential by a certain level is inputted as the input signal IN, the peak level PL outputted from the peak detector 1 rises by immediately following the offset. On the contrary, the bottom level BL outputted from the bottom detector 2 does not follow the offset immediately and is maintained almost at the current level. The reference potential REF therefore does not take the intermediate potential between the peak and the bottom of the actual input signal IN. This makes the digital signal receiving circuit unable to regenerate a correct baseband signal or output the output signal OUT having an abnormal pulse width. In the case of the occurrence of an offset such that reduces the DC potential of the input signal IN by a certain level, the same problem is raised because the peak level PL outputted from the peak detector 1 does not follow the offset.

SUMMARY OF THE INVENTION

The invention therefore has an object to provide a digital signal receiving circuit capable of regenerating a baseband signal correctly even when a DC potential offset occurs in a demodulated signal.

A digital signal receiving circuit of the present invention includes: a peak detector which maintains a peak level by following a rise in potential of an input signal and resets the peak level being maintained when a first reset signal is provided; a bottom detector which maintains a bottom level by following a drop in potential of the input signal and resets the bottom level being maintained when a second reset signal is provided; a delayed peak detector which maintains a delayed peak level by following the rise in potential of the input signal at timing lagged behind the peak detector; a delayed bottom detector which maintains a delayed bottom level by following the drop in potential of the input signal at timing lagged behind the bottom detector; a peak difference detector which outputs a peak difference by detecting a difference between the peak level and the delayed peak level; a bottom difference detector which outputs a bottom difference by detecting a difference between the bottom level and the delayed bottom level; a reset portion which outputs the second reset signal when a level difference between the peak level and the bottom level is larger than a predetermined value set corresponding to the amplitude of the input signal and the peak difference exceeds a pre-set allowable peak difference, and outputs the first reset signal when the level difference is larger than the predetermined value and the bottom difference exceeds a pre-set allowable bottom difference; and a comparator which regenerates a digital baseband signal by comparing the input signal with the reference potential obtained from the peak level and the bottom level.

In the invention, two sets of detectors each having a different time constant are provided to detect the peak level and the bottom level, and a reset signal is provided to the detectors when a level difference between two detection results exceeds a pre-set allowable difference. As a consequence, the detectors are reset when variation in DC potential occurs in an input signal, so that the peak level and the bottom level are updated to levels corresponding to the latest input signal. It is thus possible to achieve an advantage that a baseband signal can be regenerated correctly even when a DC potential offset occurs in a demodulated signal.

DETAILED DESCRIPTION OF THE INVENTION

A digital signal receiving circuit of a type which handles an input signal whose DC potential fluctuates without a change in amplitude includes a peak detector provided with a first capacitor to maintain the peak level by following a rise in potential of the input signal, a bottom detector provided with a second capacitor to maintain the bottom level by following a drop in potential of the input signal, a first level shifting portion to provide the first capacitor with a level higher than the bottom level by a predetermined value set in accordance with the amplitude of the input signal, a second shifting portion to provide the second capacitor with a level lower than the peak level by the predetermined value, and a comparator to regenerate a digital baseband signal by comparing the input signal with reference potential obtained from the peak level and the bottom level.

The above and other objects and novel features of the invention will become more fully apparent as the following description of preferred embodiments is read in light of the accompanying drawings. It should be understood, however, that the drawings are for the purpose of description and not of limitation of the invention.

Figure 1:
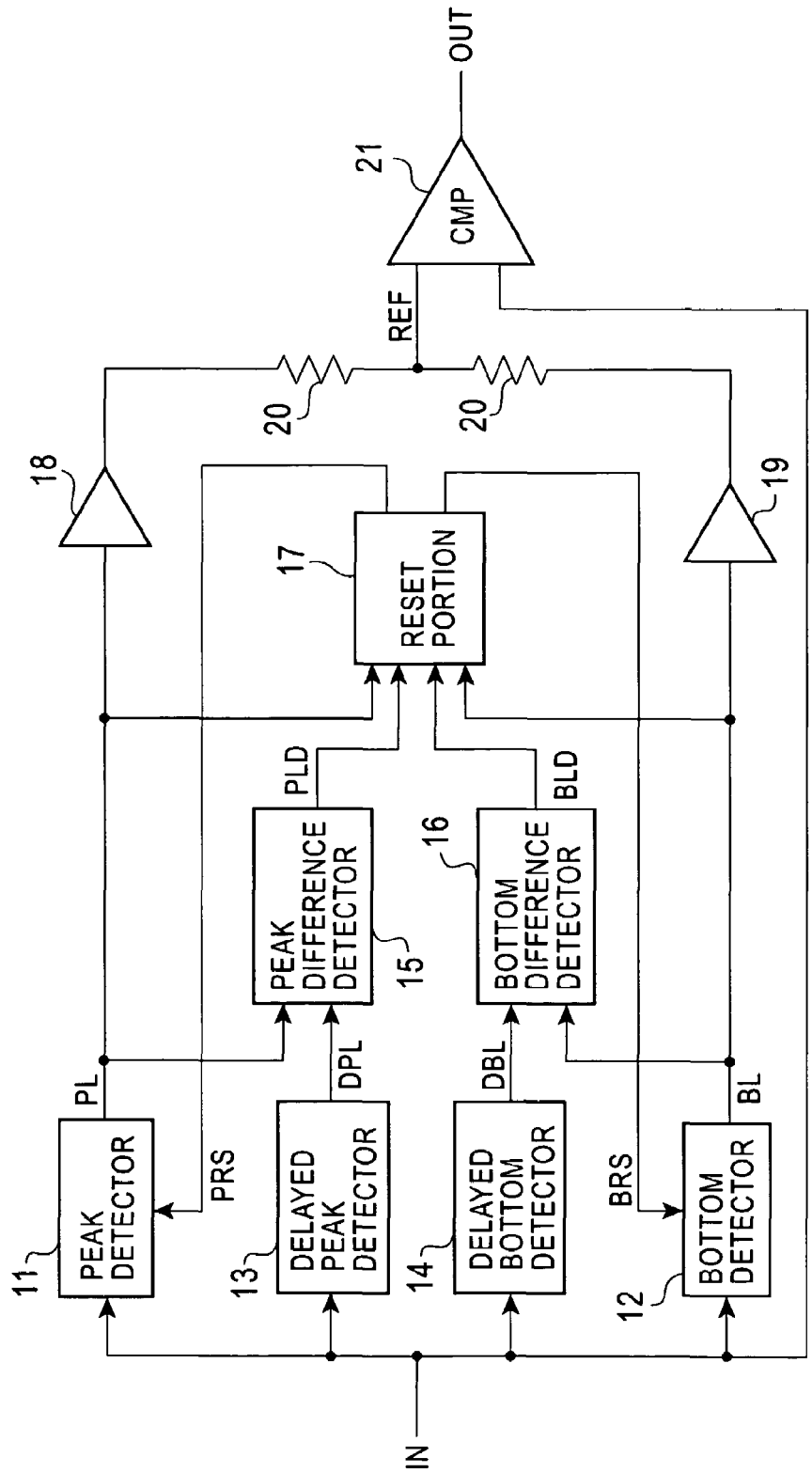
FIG. 1 is a view showing the configuration of a digital signal receiving circuit according to a first embodiment of the invention.
Figure 2:
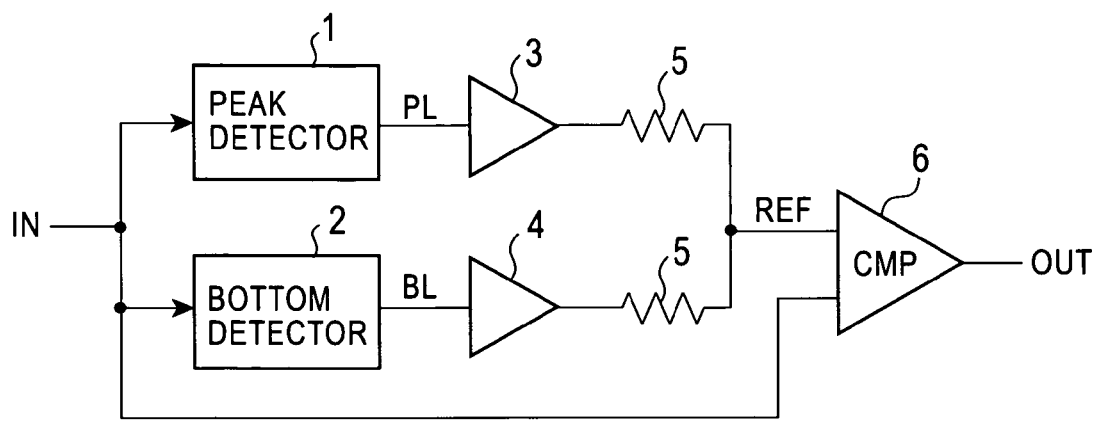
FIG. 2 is a view showing the configuration of a digital signal receiving circuit in the related art.
Figure 3:
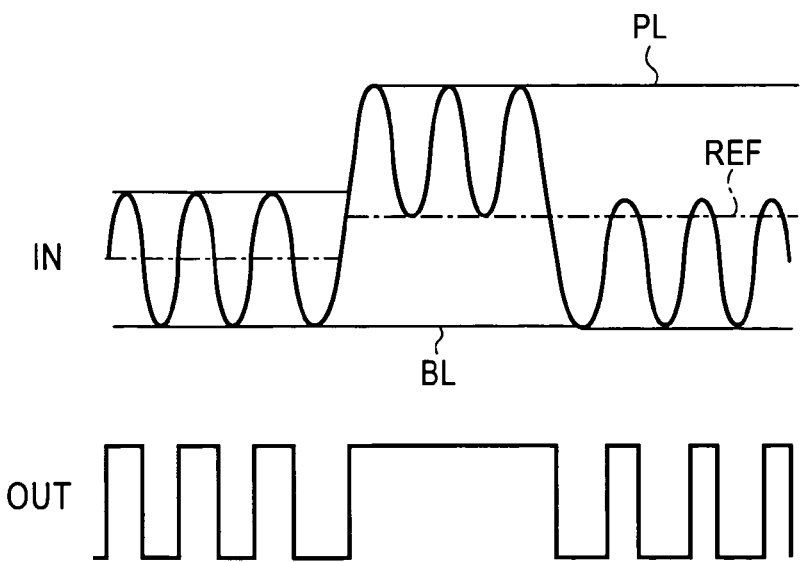
FIG. 3 is a signal waveform chart used to describe problems with the digital signal receiving circuit of FIG. 2.

FIG. 1 is a view showing the configuration of a digital signal receiving circuit according to a first embodiment of the invention.

The digital signal receiving circuit includes a peak detector 11 to which an input signal IN is supplied from a demodulator circuit (not shown), a bottom detector 12, a delayed peak detector 13 and a delayed bottom detector 14.

The peak detector 11 outputs a peak level PL by detecting the potential at the peak of the waveform of an input signal IN. The peak detector 11 is configured to maintain the peak level PL by immediately following the input signal IN when the input signal IN rises and by following the input signal IN with a large time constant when the input signal IN drops. Also, the peak detector 11 is configured to maintain the peak level PL which corresponds to a new input signal IN by resetting the peak level PL being maintained when a reset signal PRS is provided.

On the contrary to the peak detector 11, the bottom detector 12 outputs a bottom level BL by detecting potential at the bottom of the waveform of the input signal IN. The bottom detector is configured to maintain the bottom level BL by immediately following the input signal IN when the input signal IN drops and by following the input signal IN with a large time constant when the input signal IN rises. Also, the bottom detector 12 is configured to maintain the bottom level BL which corresponds to a new input signal IN by resetting the bottom level BL being maintained when a reset signal BRS is provided.

The delayed peak detector 13 detects the potential at the peak of the waveform of the input signal IN, and outputs a delayed peak level DPL. The delayed peak detector 13 is configured to maintain the delayed peak level DPL by following the input signal IN when the input signal IN rises at timing lagged behind the peak detector 11 and by following the input signal IN with a large time constant when the input signal IN drops.

Contrarily to the delayed peak detector 13, the delayed bottom detector 14 detects potential at the bottom of the waveform of the input signal IN, and outputs a delayed bottom level DBL. The delayed bottom detector 14 is configured to maintain the delayed bottom level DBL by following the input signal IN when the input signal IN drops at timing lagged behind the bottom detector 12 and by following the input signal IN with a large time constant when the input signal IN rises.

The peak level PL from the peak detector 11 and the delayed peak level DPL from the delayed peak detector 13 are provided to a peak difference detector 15, while the bottom level BL from the bottom detector 12 and the delayed bottom level DBL from the delayed bottom detector 14 are provided to a bottom difference detector 16.

The peak difference detector 15 outputs a difference between the peak level PL and the delayed peak level DPL as a peak difference PLD, and the bottom difference detector 16 outputs a difference between the bottom level BL and the delayed bottom level DBL as a bottom difference BLD. The peak difference PLD and the bottom difference BLD are provided to a reset portion 17 together with the peak level PL and the bottom level BL.

The reset portion 17 outputs a reset signal PRS for the peak detector 11 and a reset signal BRS for the bottom detector 12 depending on the states of the peak level PL, the bottom level BL, the peak difference PLD, and the bottom difference BLD. To be more specific, the reset portion 17 outputs a reset signal BRS for the bottom detector 12 when a difference between the peak level PL and the bottom level BL is equal to or larger than a predetermined value (a value comparable to the amplitude of the input signal IN in a normal state) A and the peak difference PLD exceeds a pre-set allowable peak difference PLM, and outputs a reset signal PRS for the peak detector 11 when the bottom difference BLD exceeds a pre-set allowable bottom difference BLM.

Output conditions of the reset signals can be summarized as follows:

Output condition of reset signal BRS: PL−BL>A and |PLD|>PLM

Output condition of reset signal PRS: PL−BL>A and |BLD|>BLM

The digital signal receiving circuit includes buffer amplifiers 18 and 19 which separate the peak level PL output from the peak detector 11 and the bottom level BL output from the bottom detector 12 in terms of impedance. The output ends of the buffer amplifiers 18 and 19 are connected to both ends of a resistor 20. The reference potential REF outputted from the midpoint of the resistor 20 is provided to the reference terminal of a comparator 21, whereas the input signal IN is provided to the comparison terminal of the comparator 21. An output signal OUT is thus outputted from the output end of the comparator 21.

Figure 4:
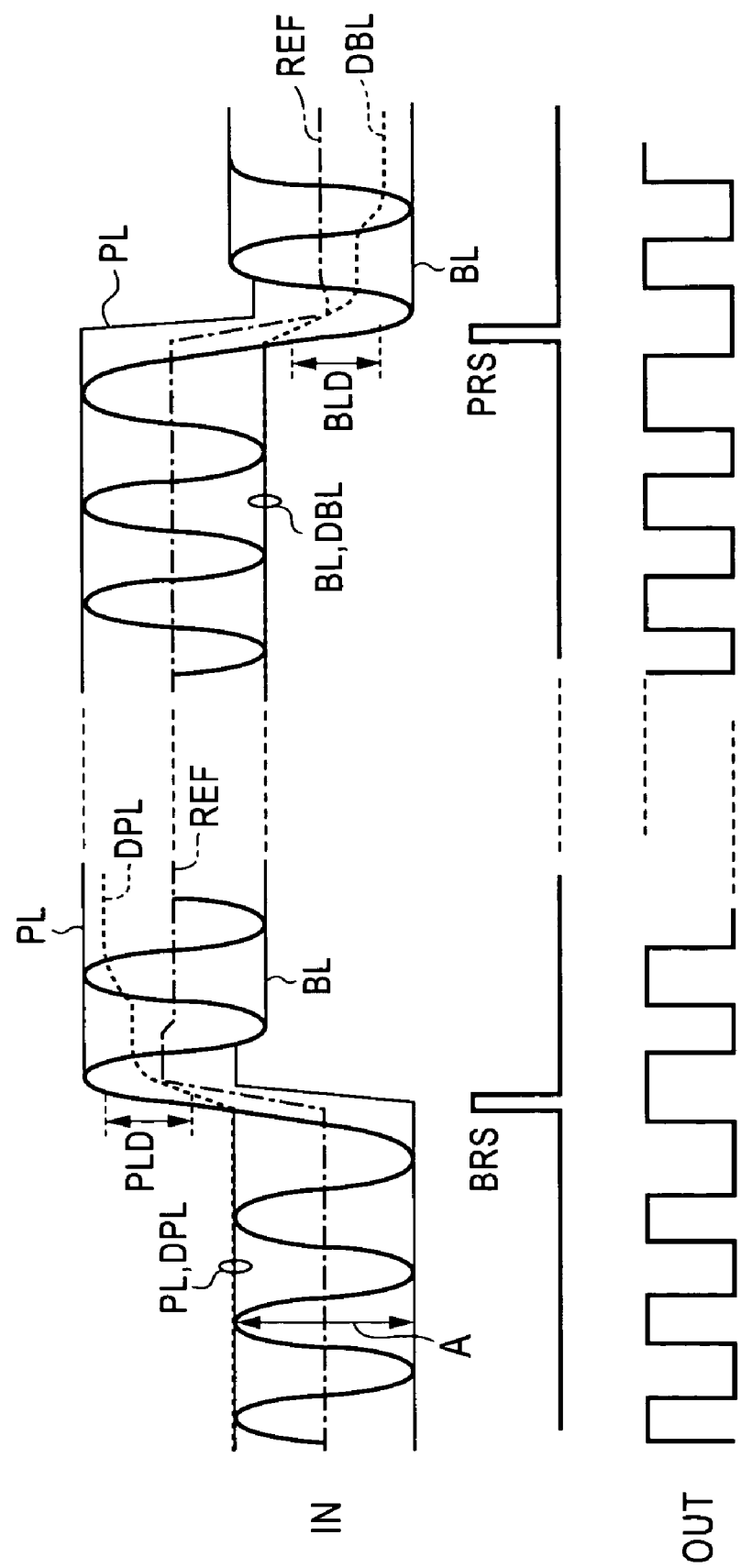
FIG. 4 is a signal waveform chart showing one example of operations according to the configuration of FIG. 1.

FIG. 4 is a signal waveform chart showing one example of operations according to the configuration of FIG. 1. Operations according to the configuration of FIG. 1 will now be described with reference to FIG. 4.

When variation in DC potential is absent in the input signal IN, the operations are the same as those of the digital signal receiving circuit in the related art.

More specifically, the peak level PL in the peak detector 11 and the delayed peak level DPL in the delayed peak detector 13 take the same value. The peak difference PLD in the peak difference detector 15 is therefore zero (0). Also, the bottom level BL in the bottom detector 12 and the delayed bottom level DBL in the delayed bottom detector 14 take the same value. The bottom difference BLD in the bottom difference detector 16 is therefore zero (0). As a consequence, the reset portion 17 outputs neither a reset signal PRS nor a reset signal BRS, and the peak detector 11 and the bottom detector 12 detect the peak level PL and the bottom level BL, respectively.

Both the peak level PL and the bottom level BL are provided to the resistor 20 via the buffer amplifiers 18 and 19, respectively. An average value of these peak level PL and the bottom level BL is outputted from the midpoint of the resistor 20 as the reference potential REF. The comparator 21 then compares the input signal IN with the reference potential REF, and regenerates a binary baseband signal indicating either "L" or "H" according to the comparison result, and the baseband signal is outputted as the output signal OUT.

Meanwhile, when variation in DC potential occurs in the input signal IN, for example, when the DC potential rises as is shown on the left of FIG. 4, the peak level PL rises abruptly, and a difference from the bottom level BL exceeds the predetermined value A. The delayed peak level DPL rises with a rise in DC potential. However, because the rising rate is lower than the rising rate of the peak level PL, the peak difference PLD increases. When the peak difference PLD exceeds the allowable peak difference PLM, the reset portion 17 outputs a reset signal BRS. As a consequence, the bottom detector 12 is reset, and so is the bottom level BL being maintained. The bottom level BL is thus corrected to be the level at the bottom of the actual input signal IN.

The reset signal BRS is released when the bottom level BL is corrected. A baseband signal is regenerated without an error using the reference potential REF generated on the basis of the corrected peak level PL and bottom level BL, and is outputted as the output signal OUT.

Also, when the DC potential drops as is shown on the right of FIG. 4, the bottom level BL drops abruptly, and a difference from the peak level PL exceeds the predetermined value A. The delayed bottom level DBL drops with a drop of the DC potential. However, because the dropping rate is lower than the dropping rate of the bottom level BL, the bottom difference BLD increases. When the bottom difference BLD exceeds the allowable bottom difference BLM, the reset portion 17 outputs a reset signal PRS. As a consequence, the peak detector 11 is reset, and so is the peak level PL being maintained. The peak level PL is thus corrected to be the level at the peak of the actual input signal IN.

The reset signal PRS is released when the peak level PL is corrected. A baseband signal is regenerated without an error using the reference potential REF generated on the basis of the corrected peak level PL and bottom level BL, and is outputted as the output signal OUT.

As described above, the digital signal receiving circuit of the first embodiment includes the peak detector 11 capable of resetting the peak level PL being maintained upon receipt of a reset signal PRS, and the bottom detector 12 capable of resetting the bottom level BL being maintained upon receipt of a reset signal BRS as well as the delayed peak detector 13, the delayed bottom detector 14, the peak difference detector 15, the bottom difference detector 16, and the reset portion 17 that together operate to reset the peak detector 11 and the bottom detector 12 when the peak level PL and the bottom level BL fluctuate abruptly. It is thus possible to detect the direction of the potential variation or variation and thereby to correct the level variation matching with the variation direction, which can in turn provide an advantage that regeneration errors of the baseband signal can be reduced.

Figure 5:
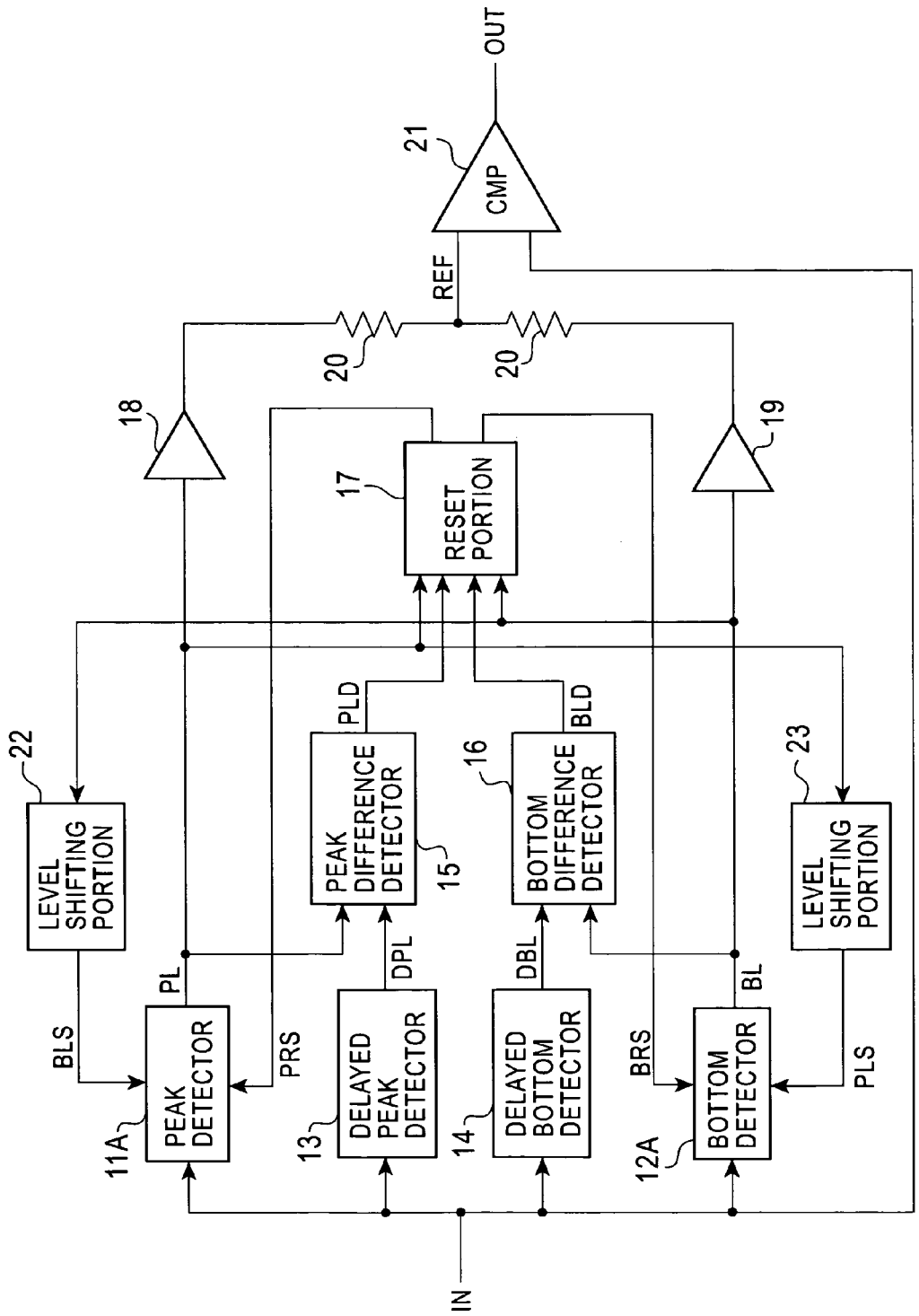
FIG. 5 is a view showing the configuration of a digital signal receiving circuit according to a second embodiment of the invention.

FIG. 5 is a view showing the configuration of a digital signal receiving circuit according to a second embodiment of the invention. Like components are labeled with like reference numerals with respect to FIG. 1.

The digital signal receiving circuit is different from the digital signal receiving circuit of FIG. 1 in that the peak detector 11 and the bottom detector 12 are replaced with a peak detector 11A and a bottom detector 12A each functioning in a slightly different manner, and that level shifting portions 22 and 23 are provided additionally to assist operations of the peak detector 11A and the bottom detector 12A.

To be more specific, the peak detector 11A is furnished with the same peak level detecting capability as that of the peak detector 11 of FIG. 1, and is configured to output the level of a shift signal BLS provided from the level shifting portion 22 as the peak level PL when are set signal PRS is provided. Likewise, the bottom detector 12A is furnished with the same bottom level detecting capability as that of the bottom detector 12 of FIG. 1, and is configured to output the level of a shift signal PLS provided from the level shifting portion 23 as the bottom level BL when a reset signal BRS is provided.

Meanwhile, the level shifting portion 22 outputs a level constantly higher than bottom level BL outputted from the bottom detector 12A by a predetermined value A (a value comparable to the amplitude of the input signal IN in a normal state) as a shift signal BLS. Also, the level shifting portion 23 outputs a level constantly lower than the peak level PL outputted from the peak detector 11A by the predetermined value A as a shift signal PLS. Hence, the shift signal BLS is at almost the same potential as the peak level PL, and the shift signal PLS is at almost the same potential as the bottom level BL.

Operations will now be described.

When variation in DC potential is absent in the input signal IN, operations of this digital signal receiving circuit are the same as those in the first embodiment from the detection of the variation in DC potential in the input signal IN until the output of a reset signal PRS or BRS.

When a reset signal BRS is provided to the bottom detector 12A, the bottom level BL outputted from the bottom detector 12A is at almost the same potential as the level of the shift signal PLS, that is, the bottom level of the actual input signal IN.

When a reset signal PRS is provided to the peak detector 11A, the peak level PL outputted from the peak detector 11A is at almost the same potential as the level of the shift signal BLS, that is, the peak level of the actual input signal IN. Operations thereafter are the same as those in the first embodiment.

As described above, the digital signal receiving circuit of the second embodiment includes the peak detector 11A which outputs a shift signal BLS being provided as a new peak level PL when the peak level PL being maintained is reset upon receipt of a reset signal PRS, and the bottom detector 12A which outputs a shift signal PLS being provided as a new bottom level BL when the bottom level BL being maintained is reset upon receipt of a reset signal BRS. Further, the digital signal receiving circuit includes the level shifting portion 22 which outputs a shift signal BLS at a level constantly lower than the peak level PL by the predetermined value A, and the level shifting portion 23 which outputs a shift signal PLS at a level constantly higher than the bottom level BL by the predetermined value A. This configuration eliminates the possibility that abnormal peak level PL or bottom level BL is outputted instantaneously when the reset signal PRS or BRS is outputted. It is thus possible to correct the level variation in a more stable manner, which can in turn provide an advantage that regeneration errors of the baseband signal can be further reduced.

Figure 6:
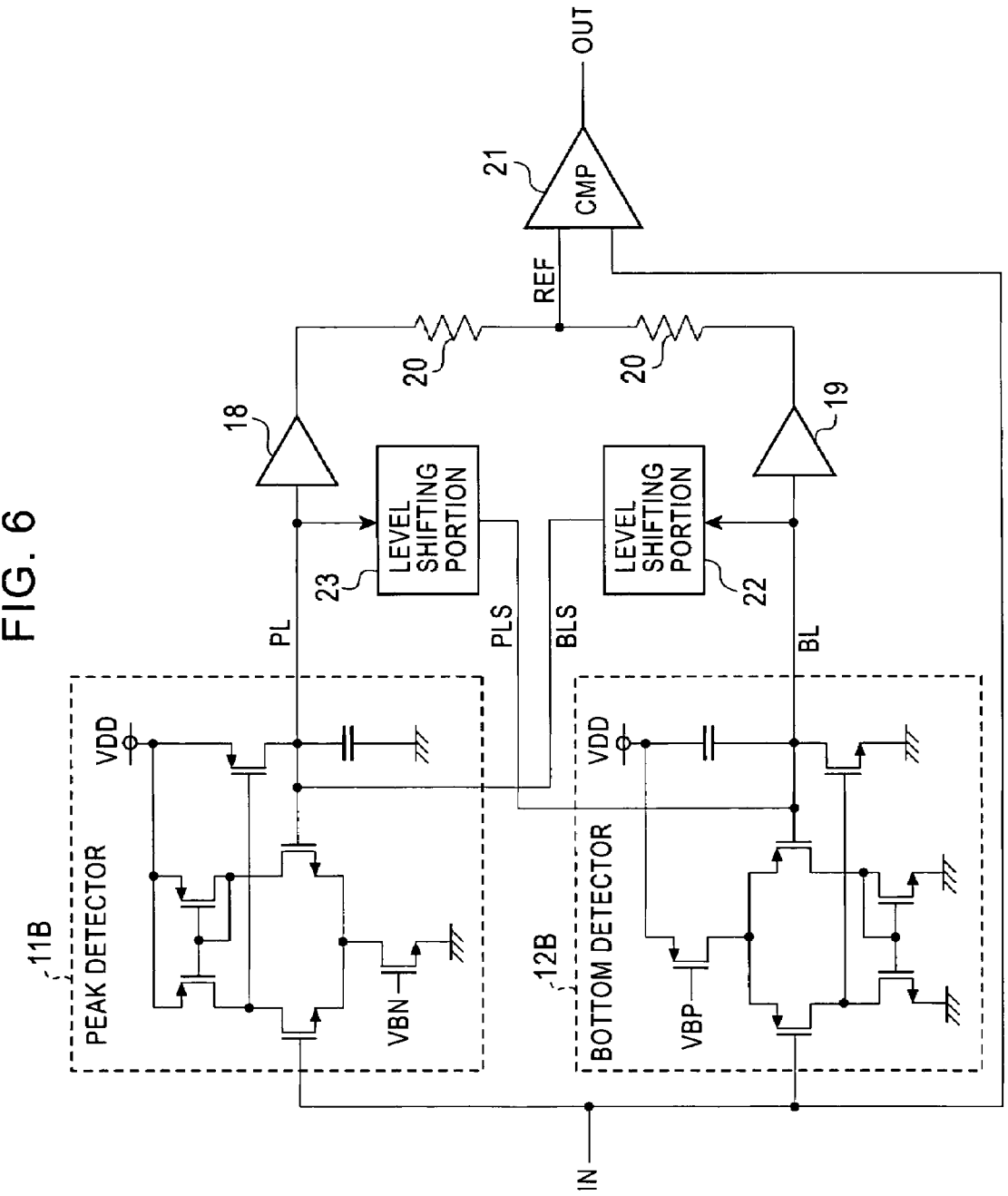
FIG. 6 is a view showing the configuration of a digital signal receiving circuit according to a third embodiment of the invention.

FIG. 6 is a view showing the configuration of a digital signal receiving circuit according to a third embodiment of the invention.

The digital signal receiving circuit comprises a peak detector 11B and a bottom detector 12B as well as the buffer amplifiers 18 and 19, the resistor 20, the comparator 21, and the level shifting portions 22 and 23 identical with their counterparts of FIG. 5.

In the peak detector 11B, a capacitor for maintaining the peak level PL is connected between an output end and a ground potential GND of a differential amplifier circuit to which the input signal IN is inputted at a first input end, and the output end is connected to a second input end. Further, a shift signal BLS from the level shifting portion 22 is provided to the capacitor in the peak detector 11B. A shift signal BLS is a signal generated so that its level is constantly higher than the bottom level BL by a predetermined value A (a value corresponding to the amplitude of the input signal IN in a normal state).

In the bottom detector 12B, a capacitor for maintaining the bottom level BL is connected between an output end and a power supply potential VDD of a differential amplifier circuit to which the input signal IN is provided at a first input end, and the output end is connected to a second input end. Further, a shift signal PLS from the level shifting portion 23 is provided to the capacitor in the bottom detector 12B. The shift signal PLS is a signal generated so that its level is constantly lower than the peak level PL by the predetermined value A.

Figure 7:
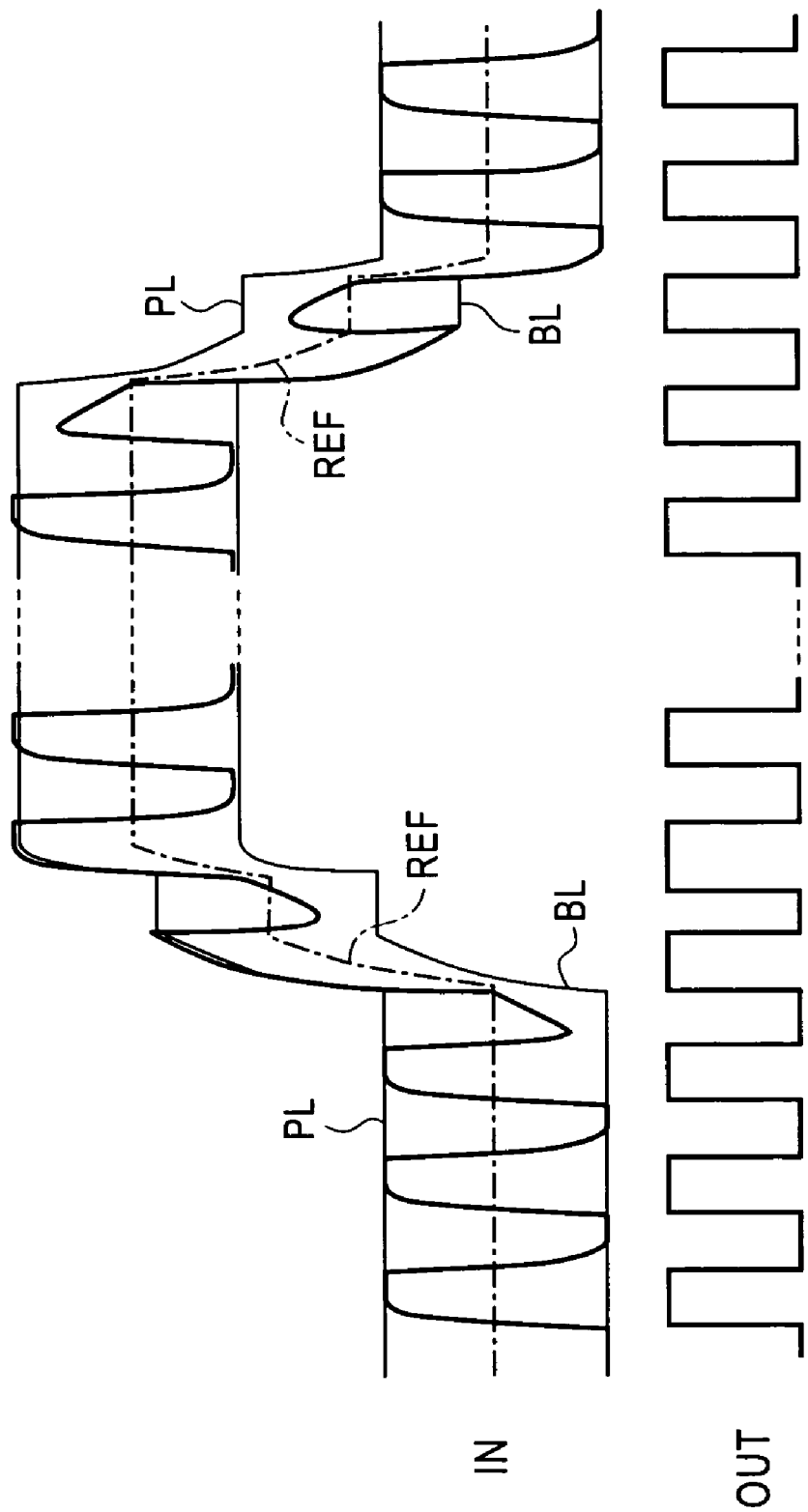
FIG. 7 is a signal waveform chart showing one example of operations according to the configuration of FIG. 6.

FIG. 7 is a signal waveform chart showing one example of operations according to the configuration of FIG. 6. Operations according to the configuration of FIG. 6 will now be described with reference to FIG. 7.

When variation in DC potential is absent in the input signal IN, a level difference between the peak level PL outputted from the peak detector 11B and the bottom level BL outputted from the bottom detector 12B is equal to the predetermined value A. Hence, a shift signal BLS outputted from the level shifting portion 22 is at the same level as the peak level PL, and therefore gives no influences to an output from the peak detector 11B. Likewise, a shift signal PLS outputted from the level shifting portion 23 is at the same level as the bottom level BL, and therefore gives no influences to an output from the bottom detector 12B. Hence, the reference potential REF is at an average level of the peak level PL and the bottom level BL. This enables the comparator 21 to regenerate a binary baseband signal without errors, and the baseband signal is outputted as an output signal OUT.

When the DC potential of the input signal IN rises abruptly, the peak level PL outputted from the peak detector 11B rises abruptly by following an abrupt rise in DC potential. Accordingly, a shift signal PLS outputted from the level shifting portion 23 increases abruptly by magnitude comparable to a rise in DC potential. Because the shift signal PLS is provided to the capacitor in the bottom detector 12B, the bottom level BL outputted from the bottom detector 12B also increases abruptly by magnitude comparable to a rise in DC potential. Further, because the bottom level BL that has risen abruptly is provided to the level shifting portion 22, a shift signal BLS also rises abruptly by magnitude comparable to a rise in DC potential. The shift signal BLS is provided to the capacitor in the peak detector 11B. However, because the potential of the capacitor has already risen by magnitude comparable to the rise in DC potential, the shift signal BLS gives no influences to the peak level PL.

According to such a feedback operation, when the DC potential of the input signal IN rises abruptly, not only the peak level PL, but also the bottom level BL can be maintained constantly at the correct level by following the variation in DC potential of the input signal IN. Likewise, when the DC potential of the input signal IN drops abruptly, not only the bottom level BL, but also the peak level PL can be maintained constantly at the correct level by following the variation in DC potential of the input signal IN.

As described above, the digital signal receiving circuit of the third embodiment includes a feedback loop that provides the bottom detector 12B with a shift signal PLS at a level lower than the peak level PL detected by the peak detector 11B by the amplitude of the input signal IN, and provides the peak detector 11B with a shift signal BLS at a level higher than the bottom level BL detected by the bottom detector 12B by the amplitude of the input signal IN. Hence, in a case where the amplitude of the input signal IN does not change, there can be achieved an advantage that a baseband signal can be regenerated without having any influence from the variation in DC potential using a quite simple configuration in comparison with the first and second embodiments.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2005-068506 which is hereby incorporated by reference.

What is claimed is:

1. A digital signal receiving circuit, comprising:
   a peak detector which maintains a peak level by following a rise in potential of an input signal and resets the peak level being maintained when a first reset signal is provided;
   a bottom detector which maintains a bottom level by following a drop in potential of the input signal and resets the bottom level being maintained when a second reset signal is provided;
   a delayed peak detector which maintains a delayed peak level by following the rise in potential of the input signal at timing lagged behind the peak detector;
   a delayed bottom detector which maintains a delayed bottom level by following the drop in potential of the input signal at timing lagged behind the bottom detector;
   a peak difference detector which outputs a peak difference by detecting a difference between the peak level and the delayed peak level;
   a bottom difference detector which outputs a bottom difference by detecting a difference between the bottom level and the delayed bottom level;
   a reset portion which outputs the second reset signal when a level difference between the peak level and the bottom level is larger than a predetermined value set corresponding to the amplitude of the input signal and the peak difference exceeds a pre-set allowable peak difference, and outputs the first reset signal when the level difference is larger than the predetermined value and the bottom difference exceeds a pre-set allowable bottom difference; and
   a comparator which regenerates a digital baseband signal by comparing the input signal with reference potential obtained from the peak level and the bottom level.

2. The digital signal receiving circuit according to claim 1, further comprising:
   a first level shifting portion which outputs a level lower than the peak level by the predetermined value as a first shift signal; and
   a second level shifting portion which outputs a level higher than the bottom level by the predetermined value as a second shift signal, wherein:

the peak detector is configured to replace the peak level being maintained with the second shift signal when the first reset signal is provided; and the bottom detector is configured to replace the bottom level being maintained with the first shift signal when the second reset signal is provided.

3. The digital signal receiving circuit according to claim 1, wherein said reference potential is an average value of the peak level and the bottom level.

* * * * *